United States Patent
Lee et al.

(10) Patent No.: US 9,947,086 B2
(45) Date of Patent: Apr. 17, 2018

(54) IMAGE ADJUSTMENT BASED ON LOCALLY FLAT SCENES

(71) Applicant: Seek Thermal, Inc., Santa Barbara, CA (US)

(72) Inventors: Jeffrey Lee, Goleta, CA (US); William J. Parrish, Santa Barbara, CA (US); Andreas Engberg, Santa Barbara, CA (US); Ross Williams, Santa Barbara, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 0 days.

(21) Appl. No.: 14/956,111

(22) Filed: Dec. 1, 2015

(65) Prior Publication Data
US 2016/0156858 A1 Jun. 2, 2016

Related U.S. Application Data (60) Provisional application No. 62/086,305, filed on Dec. 2, 2014.

(51) Int. Cl.
*G06T 5/40* (2006.01)
*G06T 5/00* (2006.01)
(Continued)

(52) U.S. Cl.
CPC ............... *G06T 5/40* (2013.01); *G06T 5/008* (2013.01); *G06T 5/20* (2013.01); *H04N 5/3656* (2013.01);
(Continued)

(58) Field of Classification Search
CPC .............................. H04N 5/3651; G03B 43/00
See application file for complete search history.

(56) References Cited

U.S. PATENT DOCUMENTS

| 5,200,623 A | 4/1993 | Cannata |
| 6,140,948 A | 10/2000 | Yu |

(Continued)

FOREIGN PATENT DOCUMENTS

| EP | 1 083 740 | 3/2001 |
| EP | 1 601 185 | 11/2005 |

(Continued)

OTHER PUBLICATIONS

PCT International Search Report and Written Opinion for PCT/US2015/032671 dated Sep. 7, 2015 in 16 pages.
(Continued)

*Primary Examiner* — Christopher K Peterson
(74) *Attorney, Agent, or Firm* — Knobbe Martens Olson & Bear LLP (57) ABSTRACT

Imaging systems and methods are disclosed that use locally flat scenes to adjust image data. An imaging system includes an array of photodetectors configured to produce an array of intensity values corresponding to light intensity at the photodetectors. The imaging system can be configured to acquire a frame of intensity values, or an image frame, and analyze the image frame to determine if it is locally flat. If the image frame is locally flat, then that image data can be used to determine gradients present in the image frame. An offset mask can be determined from the image data and that offset mask can be used to adjust subsequently acquired image frames to reduce or remove gradients.

20 Claims, 5 Drawing Sheets

(51) Int. Cl.
*H04N 5/365* (2011.01)
*G06T 5/20* (2006.01)
*H04N 5/33* (2006.01)

(52) U.S. Cl.
CPC .............. *G06T 2207/10048* (2013.01); *G06T 2207/20021* (2013.01); *H04N 5/33* (2013.01)

(56) References Cited

U.S. PATENT DOCUMENTS

| | | |
|---|---|---|
| 6,252,995 B1 | 6/2001 | Takamori |
| 6,730,909 B2 | 5/2004 | Butler |
| 6,757,442 B1 | 6/2004 | Avinash |
| 7,795,578 B2 | 9/2010 | Högasten et al. |
| 7,796,168 B1 | 9/2010 | Kostrzewa et al. |
| 7,982,652 B2 | 7/2011 | Simony et al. |
| 7,995,859 B2 | 8/2011 | Högasten |
| 8,189,050 B1 | 5/2012 | Hughes et al. |
| 8,208,026 B2 | 6/2012 | Högasten et al. |
| 8,208,755 B1 | 6/2012 | Högasten |
| 8,306,275 B2 | 11/2012 | Högasten |
| 8,340,414 B2 | 12/2012 | Högasten et al. |
| 8,373,757 B1 | 2/2013 | Nguyen |
| 8,378,290 B1 | 2/2013 | Speake et al. |
| 8,428,385 B2 | 4/2013 | Whiteside et al. |
| 8,737,760 B2 | 5/2014 | Olsson et al. |
| 8,780,208 B2 | 7/2014 | Högasten et al. |
| 9,332,186 B2 | 5/2016 | Johansson et al. |
| 9,335,352 B2 | 5/2016 | McCrea et al. |
| 2002/0022938 A1 | 2/2002 | Butler |
| 2002/0074499 A1 | 6/2002 | Butler |
| 2002/0146345 A1* | 10/2002 | Neilson ................ G01N 25/482 422/51 |
| 2004/0012676 A1* | 1/2004 | Weiner ................ G01N 21/253 348/207.1 |
| 2005/0099504 A1* | 5/2005 | Nayar .................... H04N 5/235 348/222.1 |
| 2005/0179468 A1 | 8/2005 | Zhou |
| 2006/0092297 A1 | 5/2006 | Lee et al. |
| 2006/0139198 A1 | 6/2006 | Rao et al. |
| 2006/0193509 A1 | 8/2006 | Criminisi |
| 2007/0147698 A1 | 6/2007 | Reid |
| 2009/0073278 A1 | 3/2009 | Ogawa et al. |
| 2010/0039306 A1 | 2/2010 | Simony et al. |
| 2010/0141768 A1 | 6/2010 | Liberman et al. |
| 2010/0238294 A1 | 9/2010 | Högasten et al. |
| 2011/0141368 A1 | 6/2011 | Wallace et al. |
| 2013/0064449 A1 | 3/2013 | Menikoff |
| 2013/0077888 A1 | 3/2013 | Meyers et al. |
| 2013/0147966 A1 | 6/2013 | Kostrzewa et al. |
| 2013/0169819 A1 | 7/2013 | Strandemar |
| 2013/0222604 A1 | 8/2013 | Ingerhed et al. |
| 2013/0242125 A1 | 9/2013 | Yang et al. |
| 2013/0258131 A1 | 10/2013 | Hashimoto et al. |
| 2013/0268212 A1 | 10/2013 | Makarov et al. |
| 2013/0300875 A1 | 11/2013 | Strandemar et al. |
| 2014/0015921 A1 | 1/2014 | Foi et al. |
| 2014/0016879 A1 | 1/2014 | Högasten et al. |
| 2014/0037225 A1 | 2/2014 | Högasten et al. |
| 2014/0078360 A1 | 3/2014 | Park et al. |
| 2014/0092257 A1 | 4/2014 | Högasten et al. |
| 2014/0092258 A1 | 4/2014 | Dart et al. |
| 2014/0168445 A1 | 6/2014 | Högasten et al. |
| 2014/0247365 A1 | 9/2014 | Gardner et al. |
| 2014/0313343 A1 | 10/2014 | Frank et al. |
| 2014/0313385 A1 | 10/2014 | Sato et al. |
| 2014/0355902 A1 | 12/2014 | Olsson |
| 2014/0355904 A1 | 12/2014 | Olsson |
| 2015/0146009 A1* | 5/2015 | Kostrzewa ........... H04N 5/2256 348/164 |
| 2015/0187144 A1 | 7/2015 | Roth |
| 2015/0310594 A1 | 10/2015 | Olsson |
| 2015/0312488 A1 | 10/2015 | Kostrzewa et al. |
| 2015/0312489 A1 | 10/2015 | Hoelter et al. |
| 2015/0319379 A1 | 11/2015 | Nussmeier et al. |
| 2015/0350567 A1 | 12/2015 | Parrish et al. |
| 2016/0041039 A1 | 2/2016 | Olsson |
| 2016/0042500 A1 | 2/2016 | Engberg et al. |
| 2016/0044306 A1 | 2/2016 | Chahine et al. |
| 2016/0056785 A1 | 2/2016 | Wolfe et al. |
| 2016/0057369 A1 | 2/2016 | Wolfe et al. |
| 2016/0061883 A1 | 3/2016 | Engberg et al. |
| 2016/0156858 A1 | 6/2016 | Lee et al. |
| 2016/0198102 A1 | 7/2016 | Chahine et al. |
| 2016/0202117 A1 | 7/2016 | Hosking |
| 2016/0203694 A1 | 7/2016 | Högasten et al. |
| 2016/0323525 A1 | 11/2016 | Lee |

FOREIGN PATENT DOCUMENTS

| | | |
|---|---|---|
| EP | 1667 066 | 6/2006 |
| EP | 2 157 699 | 2/2010 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 dated Oct. 16, 2015 in 12 pages.
PCT International Search Report and Written Opinion for PCT/US043547 dated Oct. 9, 2015 in 11 pages.
PCT International Search Report and Written Opinion for PCT/US045656 dated Oct. 21, 2015 in 12 pages.
Badamchizadeh, et al., Image and Graphics, Comparative Study of Unsharp Masking Methods for Image Enhancement, 2004, pp. 27-30.
PCT International Search Report and Written Opinion for PCT/US2015/063111 dated May 17, 2016 in 13 pages.
Dynamic-range compression and contrast enhancement in infrared imaging systems.
"The Integrator Amplifier," Electronics Tutorials, http://www.electronics-tutorials.ws/opamp/opamp_6.html, accessed Sep. 22, 2016.

* cited by examiner

IMAGE ADJUSTMENT BASED ON LOCALLY FLAT SCENES

CROSS-REFERENCE TO RELATED APPLICATIONS

This application claims the benefit of priority from U.S. Prov. App'n No. 62/086,305, filed Dec. 2, 2014, entitled "Image Adjustment Based on Locally Flat Scenes," which is incorporated by reference herein in its entirety.

BACKGROUND

Field

The present disclosure generally relates to image adjustment for imaging systems, such as cameras including infrared cameras for thermal imaging systems, and in particular to systems and methods for adjusting image data to reduce or remove gradients in the image data, the adjustments based on locally flat scene data.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to adjusting images to compensate for or remove gradients, e.g. temperature non-uniformity in a thermal image, may be desirable for low-cost, mass-produced systems.

SUMMARY

Example embodiments described herein have innovative features, no single one of which is indispensable or solely responsible for their desirable attributes. Without limiting the scope of the claims, some of the advantageous features will now be summarized.

An imaging system includes an array of photodetectors configured to produce an array of intensity values corresponding to light intensity at the photodetectors. The imaging system can be configured to acquire a frame of intensity values, or an image frame, and analyze the image frame to determine if it is locally flat. If the image frame is locally flat, then that image data can be used to determine gradients present in the image frame. An offset mask can be determined from the image data and that offset mask can be used to adjust subsequently acquired image frames to reduce or remove gradients.

In a first aspect, a method is provided for adjusting an image using one or more images of locally flat scenes acquired with an imaging system comprising an imaging sensor with an array of photodetectors. The method includes acquiring image data with the array of photodetectors, the image data comprising an array of pixel intensity values. The method also includes dividing at least a portion of the image data into a plurality of kernels. The method also includes determining local contrast values for individual kernels, a local contrast value of an individual kernel based at least in part on pixel values within the individual kernel. The method also includes generating an offset mask if the local contrast values for the individual kernels are less than or equal to a contrast threshold, the offset mask comprising an array of pixel adjustment values configured to adjust the pixel intensity values of the image data. The method also includes adjusting pixel intensity values of subsequently acquired image data using the offset mask.

In some embodiments of the first aspect, the method further includes dividing individual kernels into a plurality of sub-kernels. In a further embodiment, determining a local contrast value for an individual kernel includes determining an average or median of pixel intensity values within each sub-kernel of the individual kernel; and calculating a difference between a maximum sub-kernel average or median and a minimum sub-kernel average or median. In yet a further embodiment, a pixel adjustment value in the array of pixel adjustment values of the offset mask corresponds to an average or median of the pixel intensity values within an individual kernel. In another further embodiment, a pixel adjustment value in the array of pixel adjustment values of the offset mask corresponds to an average or median of the pixel intensity values within an individual kernel, the average or median being adjusted using a bi-linear interpolation between adjacent kernels.

In some embodiments of the first aspect, individual kernels are 16 by 16 pixels. In some embodiments of the first aspect, individual kernels are 16 by 16 pixels and individual sub-kernels are 4 by 4 pixels.

In some embodiments of the first aspect, the imaging sensor comprises an infrared focal plane array. In a further embodiment, the contrast threshold is configured to correspond to a temperature difference of less than or equal to 1 degree Celsius.

In some embodiments of the first aspect, the offset mask is generated if the local contrast values for at least 90% of the plurality of kernels are less than or equal to a contrast threshold. In a further embodiment, the offset mask is generated if the local contrast values for all of the plurality of kernels are less than or equal to a contrast threshold.

In some embodiments of the first aspect, adjusting pixel intensity values using the offset mask comprises subtracting pixel adjustment values from corresponding pixel intensity values. In some embodiments of the first aspect, the method further includes determining an offset mask offset comprising an average or median value of a kernel located near a center of the imaging array. In a further embodiment, the offset mask includes the offset mask offset.

In a second aspect, a thermal imaging system is provided that includes an imaging array comprising an infrared focal plane array, the infrared focal plane array configured to generate signals corresponding to levels of infrared light incident on the infrared focal plane array. The system also includes a detector circuit comprising readout electronics that receive the generated signals and output image data comprising an array of pixel intensity values. The system also includes a system controller configured to divide at least a portion of the image data into a plurality of kernels; determine local contrast values for individual kernels, a local contrast value of an individual kernel based at least in part on pixel intensity values within the individual kernel; generate an offset mask if the local contrast values for the individual kernels are less than or equal to a contrast threshold; and adjust pixel intensity values of subsequently acquired image data using the offset mask.

In some embodiments of the second aspect, the system controller is further configured to divide individual kernels into sub-kernels and to determine an average or median value of pixel intensities within each sub-kernel. In a further embodiment, a local contrast value for an individual kernel comprises a difference between a maximum average or median value of a sub-kernel and a minimum average or median value of a sub-kernel within the individual kernel.

In some embodiments of the first aspect, the contrast threshold corresponds to a temperature of less than or equal to about 1 degree Celsius.

In some embodiments of the first aspect, the system controller is further configured to determine an offset mask offset comprising an average or median value of a kernel located near a center of the imaging array. In a further embodiment, the offset mask includes the offset mask offset.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to adjusting images to compensate, correct, reduce, or remove gradients within the image. The image adjustment can be based at least in part on locally flat image frames, If an image frame is determined to be locally flat, an offset mask can be derived from the locally flat image frame. Subsequent images can be adjusted using the offset mask. The present disclosure includes systems and methods to adjust an image using an offset mask derived from locally flat scenes. To determine these locally flat scenes, the systems and methods disclosed herein compare pixel differences within kernels of an image to a threshold and if the differences are less than the threshold, the image is considered locally flat. These pixel differences can be determined using kernels and/or sub-kernels. Thus, in some embodiments, these systems and methods can reduce or remove gradients from images based on locally flat scenes rather than or in addition to adjustments made to the image based on images acquired with a shutter closed. Advantageously, this can allow the system to remove gradients from images to reserve dynamic range for other features (e.g., edges) within an image. Moreover, this can be used to correct or compensate for artifacts in the imaging system, such as non-uniformities in optics.

Although examples and implementations described herein focus, for the purpose of illustration, on implementation in an infrared camera and for thermal images, the systems and methods disclosed herein can be implemented in digital and/or video cameras that acquire visible light using a variety of image sensors. Various aspects of the disclosure will now be described with regard to certain examples and embodiments, which are intended to illustrate but not limit the disclosure.

Some embodiments described herein provide for image adjustments that compensate for low spatial frequency components in images, e.g., tilt or curvature. As used herein, these low spatial frequency components in images may generically referred to as an image gradient. These low spatial frequency components or image gradient may be due to artifacts in the imaging system. Accordingly, it may be desirable to remove these components to improve image quality.

Some embodiments described herein provide for image adjustments that compensate or correct for a thermal gradient in a thermal imaging system. The thermal gradient may be due at least in part to non-uniformities in the system optics. With the shutter open, the image adjustments can be based at least in part on the entire optical system of the thermal imaging system, from the system optics to the image sensor, for example. Some embodiments described herein include imaging systems with shutters. In such systems, the disclosed gradient and/or non-uniformity adjustments can be used in conjunction with adjustment information derived from image data acquired with the shutter in closed position.

Some embodiments described herein provide for non-uniformity and/or gradient compensation or correction that may arise due at least in part to effects from an entire field of view of an imaging sensor such as a focal plane array (FPA). An imaging system can be configured to analyze an image frame to determine adjustments that correct for non-uniformities and/or gradients by analyzing the entire image frame and adjusting pixels across the entire image frame.

The disclosed systems and methods for adjusting an image may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a device mated to the camera core, such as a mobile appliance including smart phones, tablets, personal computers, etc. In some implementations, the processing and memory elements of the imaging system may be in programmable logic or on-board processors that are part of the core or camera system. In some embodiments, image gain calibration may be accomplished on a processing element on the camera core, and further image processing and display may be accomplished by a system controller mated to the core.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a read out integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. patent application Ser. No. 14/829,500, filed Aug. 18, 2015, U.S. patent application Ser. No. 14/292,124, filed May 30, 2014, U.S. patent application Ser. No. 14/829,490, filed Aug. 18, 2015, U.S. patent application Ser. No. 14/817,989, filed Aug. 4, 2015, U.S. patent application Ser. No. 817,847, filed Aug. 4, 2015, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. In particular, at least some these references utilize a shutter that is configured to periodically expose the imaging sensor to a known, repeatable scene to acquire image data that can be used to update adjustments to improve image quality. However, some image degradation may be due at least in part to effects that the shutter occludes, such as effects due to system optics. For instance, parts of the optical system may not be of uniform reflectivity, or parts of the optical system may not be of uniform temperature in a thermal imager, and this may manifest itself as a gradient (e.g., a low frequency tilt or curve) across a scene image that should be substantially flat or locally flat. In some instances, the scene itself may have an actual thermal or optical gradient that is not of interest to an observer that is more focused on objects within the scene.

In either case, an image gradient may have the effect of utilizing dynamic range of the display system that may be more advantageously allocated for high frequency components in a scene, such as edges or shapes. Thus, it may be useful to reduce or remove low spatial frequency components in images (e.g., gradients, tilt, curvature, etc.) that may not be present with the shutter closed. If the imaging system were limited to only providing image adjustments using techniques based on data acquired with the shutter closed, these low spatial frequency components may be missed. Such scene-based non-uniformity corrections may be performed in a number of ways. Techniques that complement shutter-based adjustments may be particularly desirable. It may be particularly advantageous for an imaging system to utilize image adjustment systems and methods that are configured to adjust for specific artifacts in images wherein the specific artifacts are those that are complementary to the artifacts adjusted for with shutter-based techniques.

Example Imaging Systems

Figure 1A:
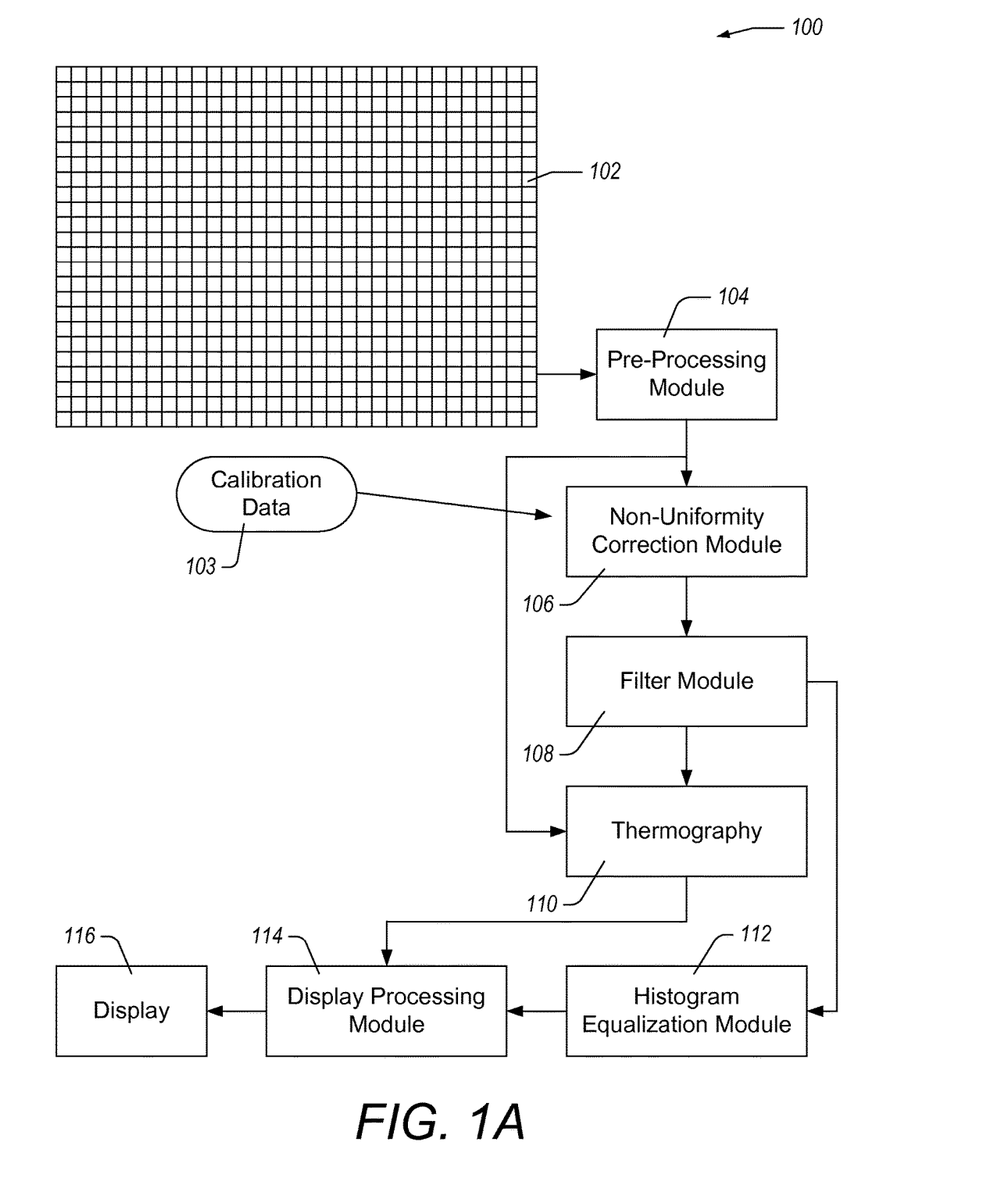
FIG. 1A illustrates a functional block diagram of an example imaging system.

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a read out integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g., calibration data 103) that can be used during image processing to generate a superior image. For example, calibration data 103 may include bad pixel maps and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated read out electronics. The read out electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are described in greater detail in U.S. patent application Ser. No. 14/829,490, entitled "Gain Calibration for an Imaging System," filed Aug. 18, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are described in greater detail in U.S. patent application Ser. No. 14/829,500, filed Aug. 18, 2015, entitled "Adaptive Adjustment of the Operating Bias of an Imaging System," the entire contents of which is incorporated by reference herein.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the read out integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail herein with reference to FIGS. 2-4.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
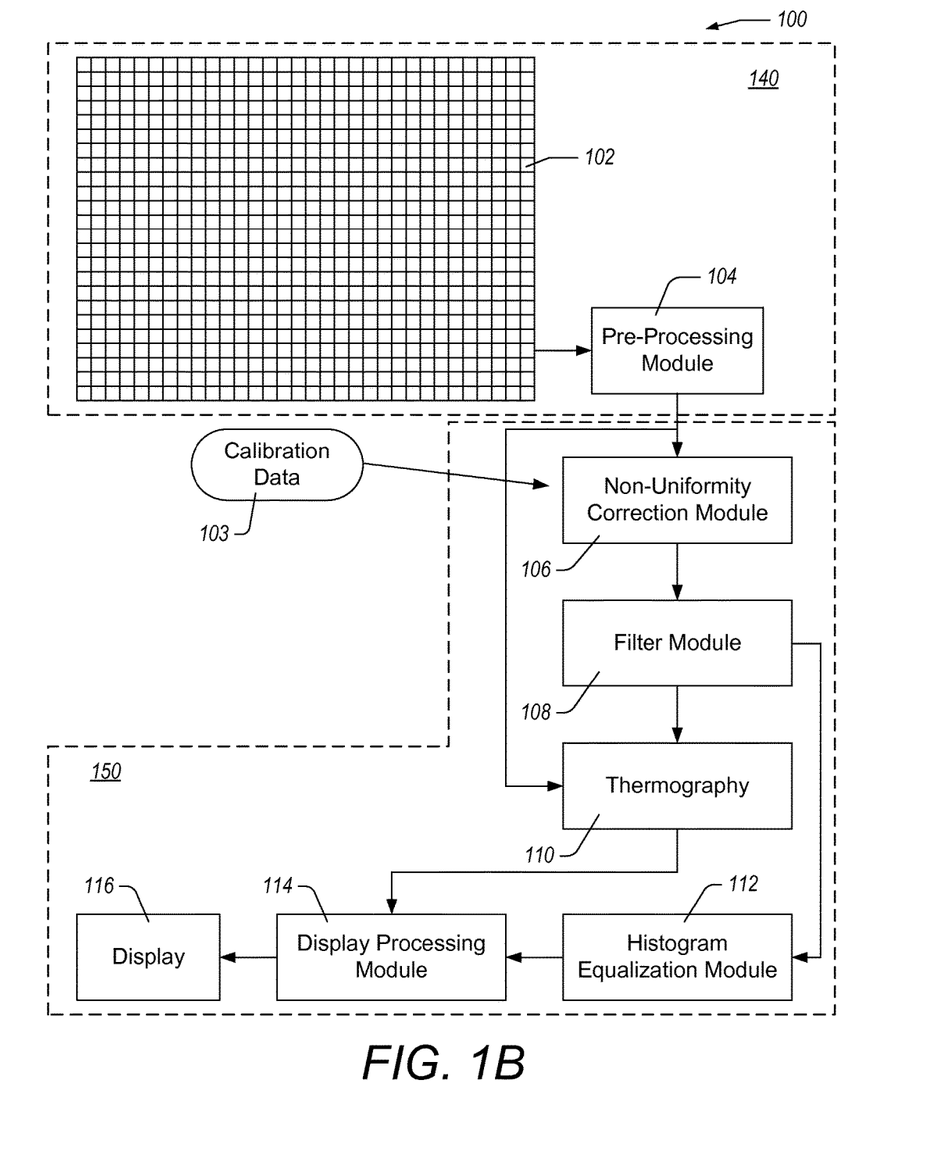
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Image Gradient Adjustment Systems and Methods

Figure 2:
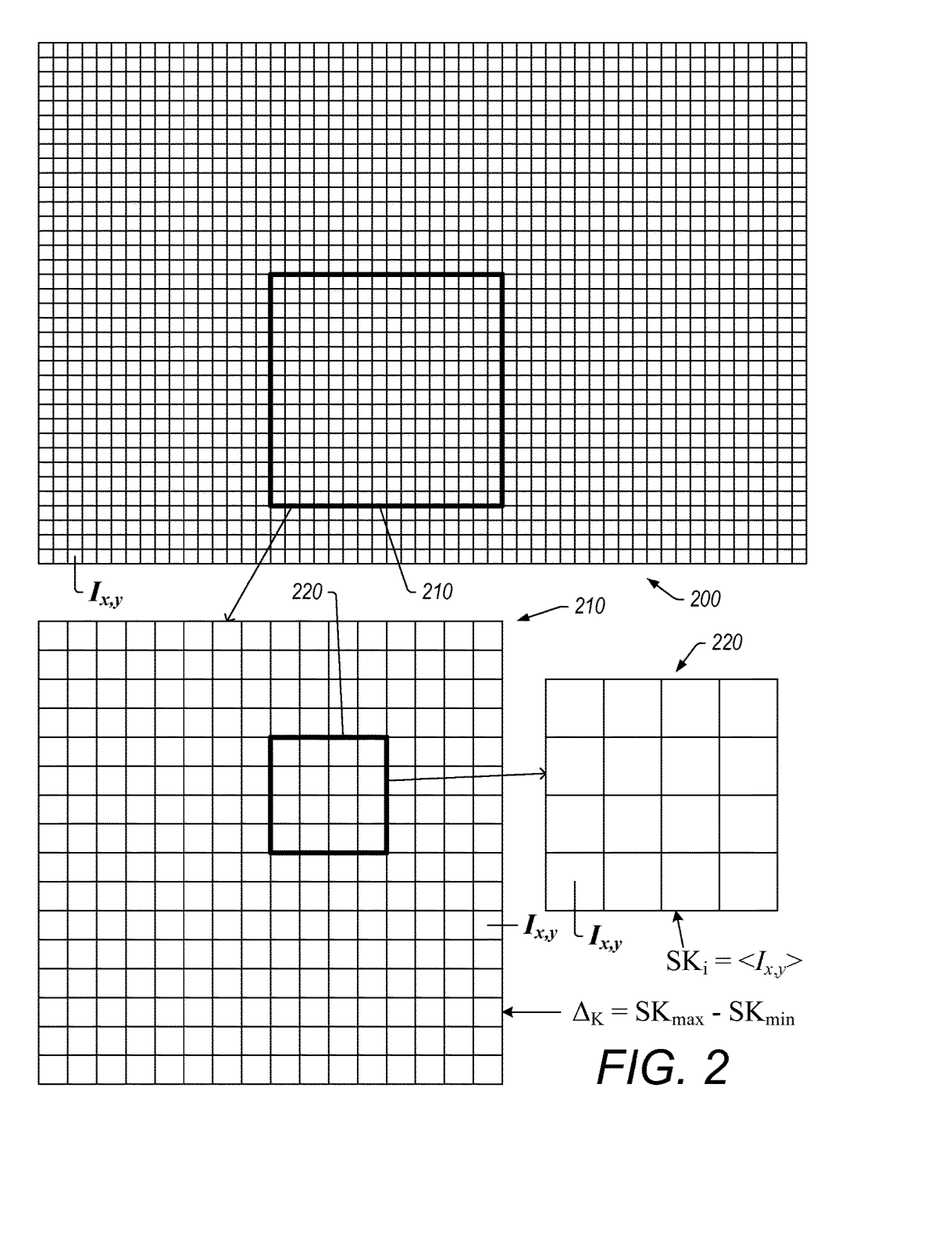
FIG. 2 illustrates an example of an image frame being divided into kernels and sub-kernels to determine if the image frame is locally flat.

FIG. 2 illustrates an example of an image frame 200 being divided into kernels 210 and sub-kernels 220 to determine if the image frame 200 is locally flat. The image frame 200 represents image data acquired with an image sensor, for example. The image data can be an array of pixel values that represent light intensity of a scene. The image data can be thus represented as a two-dimensional array of intensity values, $I_{x,y}$, corresponding to readings from an image sensor. An intensity value, $I_{x,y}$, can be a numeric value derived by digitizing the output of the corresponding pixel in an image sensor. This intensity value can correlate to a temperature where the image sensor is a thermal image sensor. Thus, intensity values, or pixel values, are correlated with temperatures in a scene being imaged by a thermal imager.

In some imaging systems, a shutter can be included that can be configured to selectively occlude and expose an image sensor. The imaging system can be configured to acquire image data with the shutter closed to determine one or more image adjustment parameters. For example, with the shutter closed the imaging system can acquire a flat field and determine non-uniformity corrections based on the acquired flat field. These corrections can be applied to images acquired with the shutter open. These corrections can be applied to image data prior to displaying the image data on a display, as described herein with reference to FIG. 1A.

These imaging systems can also be configured to determine image adjustment parameters based at least in part on image data acquired with the shutter open. The adjustment parameters can be applied to subsequent image data acquired with the shutter open. The application of these scene-based adjustment parameters can be performed in the image processing chain any time after digitization of the image data and can be applied before the image data undergoes histogram equalization and/or before the image data is formatted for display, each of which is described in greater detail herein with reference to FIG. 1A. In some embodiments, the application of these scene-based adjustment parameters can be performed after display formatting. However, it may be advantageous to apply these scene-based adjustment parameters prior to display formatting. This may be advantageous because application of the adjustment parameters can reduce or remove gradients in the image, reducing pixel variations, thereby reducing utilization of available dynamic range in the display. This can beneficially allow more dynamic range of the display to be allocated to scene features (e.g., edges, shapes, etc.).

To determine scene-based image adjustment parameters, the image frame 200, or at least a portion of the image frame 200, can be divided into kernels 210. In some embodiments, the kernels 210 can be sized so that they are sufficiently large to contain information related to the overall shape of the image but sufficiently small to isolate local areas. For example, in an exemplary imaging sensor such as an infrared focal plane array having a few hundred pixels on a side, 16 by 16 pixel kernels 210 can be advantageous. However, the kernels 210 can have different sizes and need not be square. In addition, the kernels 210 can be configured to have different sizes rather than uniform sizes. In some embodiments, individual kernels 210 can be further divided into sub-kernels 220. As an example, a sub-kernel 220 of a 16 by 16 kernel can be a sub-kernel of 4 by 4 pixels. Similar to the kernels 210, the sub-kernels 220 can be different sizes and need not be square. In some embodiments, the sub-kernels 220 can be 1 by 1 pixel which is equivalent to not dividing the kernels 210 into sub-kernels.

With the kernels 210 defined, an intensity range or local contrast, $\Delta_K$, of individual kernels 210 can be determined. An image frame 200 can be considered locally flat where all or substantially all of the kernels have a local contrast, $\Delta_K$, that is less than a contrast threshold, $\alpha$. The contrast threshold can be configured so that it distinguishes between kernels that are locally flat and kernels that contain object shape and/or edge information. In certain implementations, an imaging system can include a thermal imaging sensor whose output is digitized into a number of counts (e.g., using an analog-to-digital conversion). The contrast threshold can be configured to correspond to a number of counts that corresponds to a few degrees Celsius or Fahrenheit. In some implementations, the contrast threshold can be configured to be a number of counts corresponding to less than or equal to about 1 degree. If the local contrast of a targeted, selected, or defined percentage of the kernels is less than the contrast threshold, then the image frame 200 can be designated a locally flat image. The percentage can be at least 90% of the kernels, at least 95% of the kernels, at least 99% of the kernels, or 100% of the kernels. This can occur, for example and without limitation, where an imaging system is acquiring image data of a flat surface or other scene with little or no object shape information or edges. In such images, low spatial frequency components can exist, such as gradients (e.g., intensity tilt, intensity curvature, etc.) that are larger than individual kernels. Such low spatial frequency components can arise due at least in part to non-uniform behavior of the optics of the imaging system or due at least in part to uninteresting optical or temperature gradients in the scene. In such situations, it may be desirable to reduce or remove these components.

Where the image frame 200 is designated as locally flat, the image data from the image frame 200 can be used to derive adjustment parameters. This is due at least in part to the scene being imaged being free or mostly free of edges or shapes so that the feature of note in the scene is the gradient to be reduced or removed. To derive the adjustment parameters, an offset mask can be derived wherein the offset mask is representative of the gradient in the scene. This offset mask can then be used to adjust subsequent images to reduce or remove the gradient from the images acquired of the scene. In some implementations, the offset mask can be a pixel-by-pixel representation of the low spatial frequency components of the image frame 200 that can be subtracted, pixel by pixel, from subsequent image frames.

Figure 3:
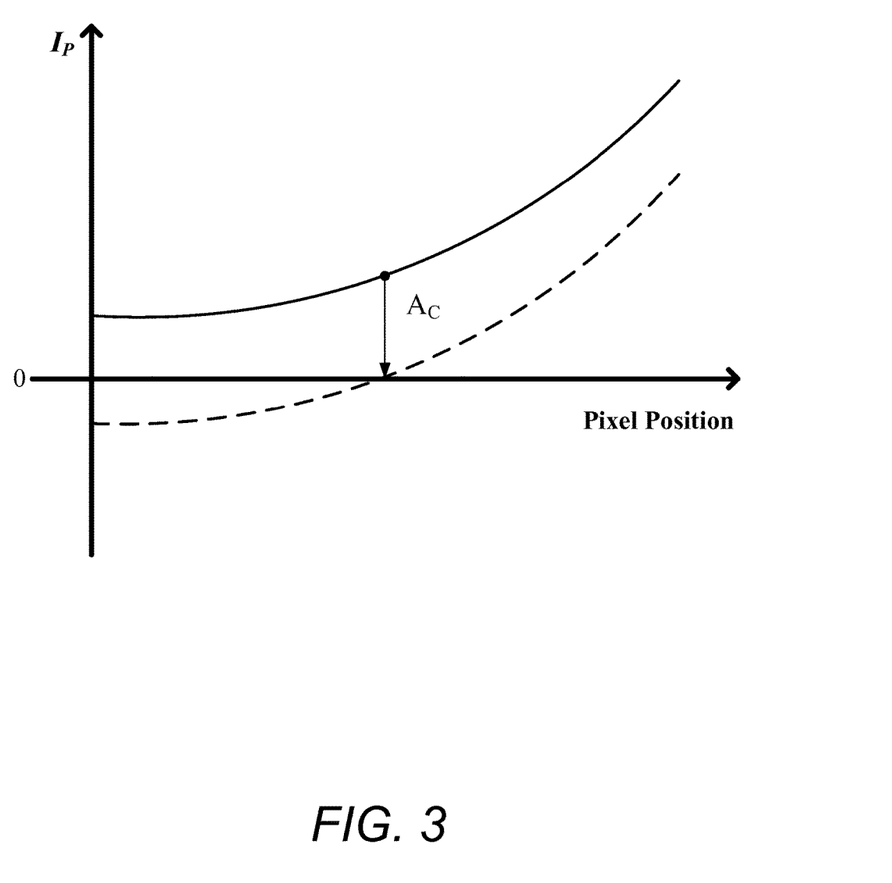
FIG. 3 illustrates an example of a gradient along one dimension in an image frame.

FIG. 3 illustrates an example of a gradient along one dimension in an image frame. The plot represents pixel intensity values along one direction where the y-axis corresponds to pixel intensity, $I_P$, and the x-axis corresponds to pixel position. The solid line represents the pixel intensity values within a column, row, or along a diagonal, for example. As illustrated, the pixel intensity values are offset from zero, as may be the case, for example, in a thermal image of a surface with a uniform temperature surface where the offset corresponds to the average or median temperature of the surface. In some implementations, it may be desirable to adjust the pixel intensities to remove this offset. In some instances, it may be undesirable or disadvantageous to not adjust for this offset as it may reduce available dynamic range. This may be the case even where the gradient (e.g., tilt or curvature) is reduced or corrected. Accordingly, in some implementations, the image intensity values can be adjusted by an offset value, $A_C$. In various implementations, the offset value can be defined, determined, or selected to center the image intensity values around a zero reference point. The dotted line in FIG. 3 represents pixel intensity values that have been shifted by the offset value, $A_C$. These values can be further adjusted to reduce or remove the gradient present in the pixel intensity data. Thus, in some embodiments, the disclosed image adjustment systems and methods can be a combination of an offset adjustment and a gradient adjustment.

By way of illustration, a particular implementation will be described for determining scene-based image adjustment parameters. However, it is to be understood that the following example embodiment is not intended to limit the scope of the disclosed image adjustment systems and parameters. The local contrast, $\Delta_K$, of a kernel can be determined by iterating through individual sub-kernels in the kernel and determining an average or median value of the pixel intensities within individual sub-kernels, $SK_i = \langle I_{x,y} \rangle_i$, and determining a difference between the highest sub-kernel average or median value and the lowest sub-kernel average or median value:

$$\Delta_K = SK_{max} - SK_{min}.$$

In the case where there is no sub-kernel or where the sub-kernel is defined as a 1×1 pixel, the local contrast of a kernel is the difference between the maximum pixel intensity value and the minimum intensity value within the kernel. By defining individual sub-kernels to include a plurality of pixels, the effects of single outlier pixel values or single pixel aberrations can be reduced or eliminated. Although computing average values may be utilized in some embodiments, as described above, certain embodiments may compute median values. Both computing averages and computing medians may have advantages. Using computed averages may smooth out variations, while using computed medians may tend to depress the effect of outliers, such as dead or noisy pixels. In the examples disclosed herein, averages, medians, or a combination of these may be employed. Similarly, other statistical measurements of uniformity can be utilized to determine whether a kernel contains an edge or other feature of a scene.

Once the local contrast is determined for each kernel in the image frame, the local contrast values can be compared to a threshold to determine if the image frame is a locally flat image. For example, if all of the local contrast values are less than a contrast threshold, $\alpha$, then the image frame can be designated as a locally flat image. If one or more local contrast values exceed the contrast threshold, then the image frame can be designated as not locally flat. As described herein, the number or fraction of kernels that are less than the contrast threshold to designate the image frame as locally flat can be less than 100% of the kernels, such as at least 80%, at least 90%, at least 95%, or at least 99%. Where the image frame is locally flat, the process of determining image adjustment parameters can proceed to determining an offset mask based on the pixel values in the kernels.

In some embodiments, the offset mask is constructed by assigning pixel values in the offset mask based on pixel values in the kernel. For example, offset mask pixel values corresponding to pixels within a kernel can be assigned to the average or median pixel intensity value within that kernel. In some embodiments, the overall offset of the offset mask can be adjusted by using the average or median pixel value at the center of the image. For example, the average or median value of a center kernel, $A_C$, can be subtracted from every pixel in the offset mask, effectively centering the offset mask around 0. This can be represented as:

$$OM_p = <K>_p - A_C$$

where $OM_p$ represents the value of the p-th pixel in the offset mask, $<K>_p$ represents the average or median value of the pixels within the kernel in which the p-th pixel is located, and $A_C$ represents the average or median value of the center kernel.

In some embodiments, the transitions between kernels can be softened to reduce or avoid the addition of artifacts into images adjusted using the determined offset mask. For example, pixel values of the offset mask can be set based on bi-linear interpolations of the kernel average or median values. This can reduce or eliminate the appearance of false edges in an image adjusted using the determined offset mask.

The offset mask can be determined once or intermittently. For example, the offset mask can be determined and/or updated each time a locally flat image is acquired. As another example, the offset mask can be determined when a locally flat image is acquired and that offset mask can be applied without updating or adjusting it. As another example, the offset mask can be determined and/or updated at defined intervals. When an interval begins, the offset mask can be determined and/or updated the next time a locally flat image is acquired. This offset mask can be used until the next interval begins and a locally flat image is acquired after the beginning of the next interval. Application of the offset mask can effectively remove gradients and/or other low spatial frequency non-uniformities that may be present in image data. In some embodiments, the offset mask is used to adjust acquired images when the images are determined to not be locally flat. In some embodiments, all or substantially all images acquired after the offset mask has been generated are adjusted using the offset mask.

In embodiments where the offset mask is updated periodically or intermittently, it may be advantageous to update the mask using the previous offset mask(s) and the current offset mask. This can smoothly phase in updates to the offset mask and can reduce or eliminate sudden changes in the offset mask. For example, contributions from the current and previous offset masks can be weighted and combined to generate the offset mask. In some implementations, each pixel in the offset mask acquired at time t could be set to the weighted sum of current and previous pixel values:

$$OM_p = A*P_t + B*P_{t-1} + C*P_{t-2} + \ldots$$

where $A+B+C+ \ldots =1$ and Pt is the pixel value at time t and $P_{t-n}$ is the pixel value of the offset mask in the n-th previous iteration. In certain implementations, the offset mask value is set equal to the weighted sum of the previous offset mask pixel value and the current offset mask pixel value: $OM_p = A*P_t + B*P_{t-1}$ where A is 0.2 and B is 0.8.

Example Method of Compensating for a Gradient in an Image

Figure 4:
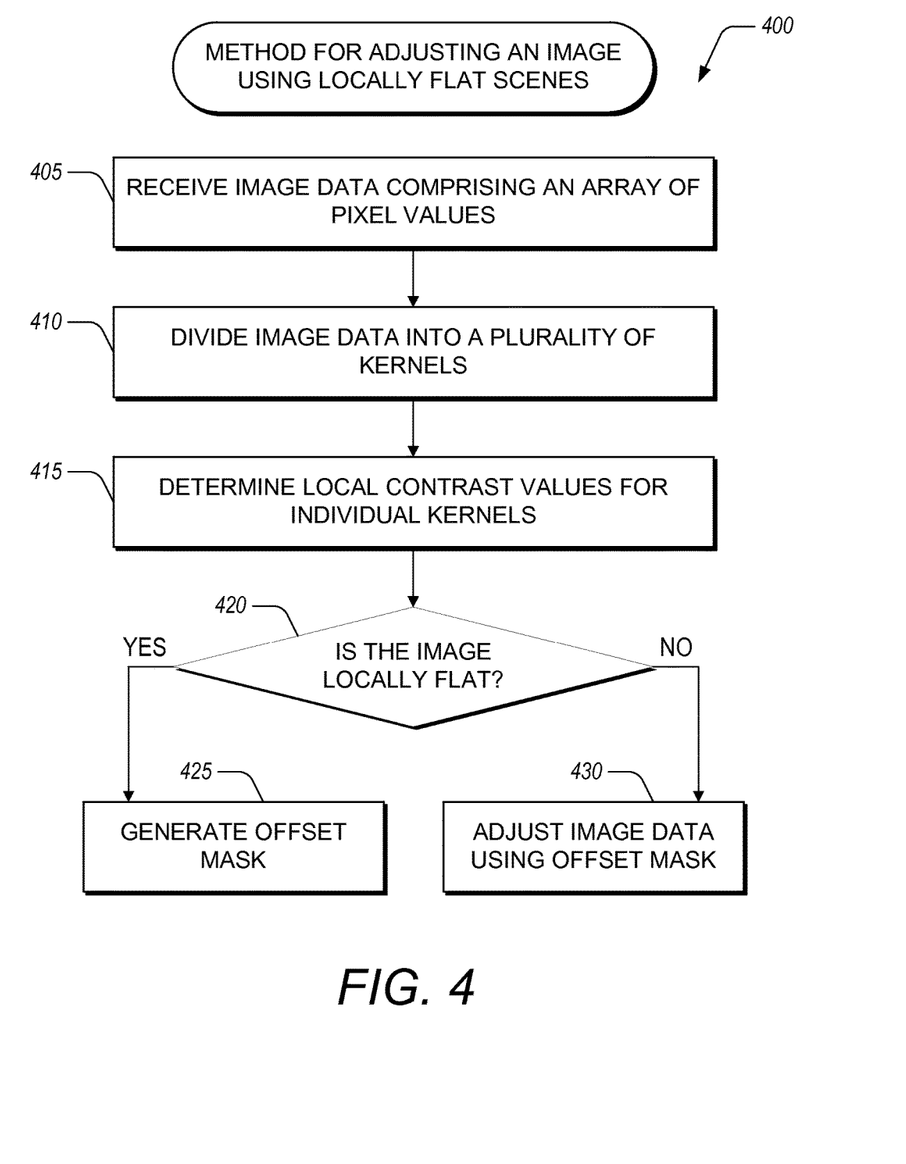
FIG. 4 illustrates a flow chart of an example method for adjusting an image using one or more images of locally flat scenes.

FIG. 4 illustrates a flow chart of an example method 400 for adjusting an image using one or more images of locally flat scenes. The method 400 can be implemented using one or more hardware components in a thermal imaging system or image processing system. For ease of description, the method 400 will be described as being performed by the imaging system 100 described herein with reference to FIGS. 1A and 1B. However, one or more of the steps of the method 400 can be performed by any module, such as the filter module 108, or combination of modules in the imaging system 100. Similarly, any individual step can be performed by a combination of modules in the imaging system 100.

In block 405, the imaging system receives image data comprising an array of pixel values. In some embodiments, the pixel values, $P_{ij}$, represent a two-dimensional array of pixel values where the indices i and j are used to indicate a particular pixel value in the array. The image data can be acquired with an image sensor that is part of the imaging system. The image data can be received from a data storage or memory or directly through a signal processing path from the image sensor that acquired the image data. In certain implementations, the image data is acquired with a focal plane array of an infrared camera or thermal sensor.

In block 410, the imaging system divides the image frame into a plurality of kernels. As an example, the image frame can be divided into a plurality of 16-pixel by 16-pixel kernels. In some embodiments, the imaging system can further divide individual kernels into sub-kernels. As an example, an individual kernel can be divided into a plurality of 4-pixel by 4-pixel sub-kernels. Where the kernel is divided into sub-kernels, the imaging system can be configured to determine average or median pixel values within individual sub-kernels.

In block 415, the imaging system determines local contrast values for individual kernels in the image data. A local contrast value for an individual kernel can be correlated to the variation of pixel values within the kernel. A local contrast value for an individual kernel can be a difference between the maximum and minimum pixel values within the kernel. A local contrast value for an individual kernel can be a difference between maximum and minimum sub-kernel values, where an individual sub-kernel value corresponds to the average or median of the pixel values within the sub-kernel.

In block 420, the imaging system determines whether the image is locally flat by comparing the local contrast values of the kernels to a contrast threshold, $\alpha$. In some embodiments, if the largest local contrast value is less than or equal to the contrast threshold, then the image is designated as locally flat. In some embodiments, if at least N % of the local contrast values are less than or equal to the contrast threshold then the image is designated as locally flat, where the value N can be, for example and without limitation, about 80%, 90%, 95%, or 99%. The contrast threshold can be set to correspond to a corresponding temperature difference threshold in a thermal imaging system. For example, in a thermal imaging system the contrast threshold can be set to a value that corresponds to a few degrees Fahrenheit or Celsius (e.g., 2 deg., 3 deg., 4 deg., etc.), or a value that corresponds to about 1 degree.

The imaging system proceeds to block 425 if the image is designated as locally flat. In block 425, the imaging system generates an offset mask using pixel data from the acquired image frame. In some embodiments, pixel values of the offset mask correspond to the average or median value of the pixels within the kernel in which the pixel is located. For example, the offset mask pixel $OM_{Pm,n}$ is set to the average or median value of the kernel, K, that contains the pixel $P_{m,n}$. In some embodiments, the offset mask pixel values can be adjusted using a bi-linear interpolation between the average or median pixel values of the kernels. This can be done to soften transitions between kernels or to reduce variation of offset mask pixel values between adjacent kernels. In some embodiments, offset mask pixel values can be further adjusted by subtracting the average or median of the pixel values of a central or other designated kernel. In some embodiments, the imaging system updates the offset mask using current and previous offset mask pixel values using a weighted sum or weighted average of these values.

In some embodiments, the imaging system can limit or control the frequency with which the offset mask is generated or updated. For example, the offset mask can be updated or determined each time a locally flat image is acquired. As another example, the offset mask can be updated or determined with a defined minimum time between updates to the offset mask. As another example, the offset mask can be determined once and this offset mask can be used throughout an imaging session.

The imaging system proceeds to block 430 if the image is designated as not locally flat. If an offset mask has been defined, the imaging system applies the defined offset mask to the image data. In some embodiments, applying the offset mask comprises subtracting the offset mask pixel values from corresponding pixel values in the image frame.

The embodiments described herein are exemplary. Modifications, rearrangements, substitute processes, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for adjusting an image using one or more images of locally flat scenes acquired with an imaging system comprising an imaging sensor with an array of photodetectors, the method comprising:
   acquiring image data with the array of photodetectors, the image data comprising an array of pixel intensity values;
   dividing at least a portion of the image data into a plurality of kernels;
   determining local contrast values for individual kernels, a local contrast value of an individual kernel based at least in part on pixel values within the individual kernel;
   determining that the image frame is a locally flat image if the local contrast values for at least a predetermined number of the individual kernels are less than or equal to a contrast threshold; and
   in response to determining that the image frame is a locally flat image:
      calculating an array of pixel adjustment values to generate an offset mask configured to adjust the pixel intensity values of the image data; and
      adjusting pixel intensity values of subsequently acquired image data using the offset mask.

2. The method of claim 1 further comprising dividing individual kernels into a plurality of sub-kernels.

3. The method of claim 2, wherein determining a local contrast value for an individual kernel comprises:
   determining an average or median of pixel intensity values within each sub-kernel of the individual kernel; and
   calculating a difference between a maximum sub-kernel average or median and a minimum sub-kernel average or median.

4. The method of claim 3, wherein a pixel adjustment value in the array of pixel adjustment values of the offset mask corresponds to an average or median of the pixel intensity values within an individual kernel.

5. The method of claim 3, wherein a pixel adjustment value in the array of pixel adjustment values of the offset mask corresponds to an average or median of the pixel intensity values within an individual kernel, the average or median being adjusted using a bi-linear interpolation between adjacent kernels.

6. The method of claim 2, wherein individual kernels are 16 by 16 pixels and individual sub-kernels are 4 by 4 pixels.

7. The method of claim 1, wherein individual kernels are 16 by 16 pixels.

8. The method of claim 1, wherein the imaging sensor comprises an infrared focal plane array.

9. The method of claim 8, wherein the contrast threshold is configured to correspond to a temperature difference of less than or equal to 1 degree Celsius.

10. The method of claim 1, wherein the offset mask is generated if the local contrast values for at least 90% of the plurality of kernels are less than or equal to a contrast threshold.

11. The method of claim 10, wherein the offset mask is generated if the local contrast values for all of the plurality of kernels are less than or equal to a contrast threshold.

12. The method of claim 1, wherein adjusting pixel intensity values using the offset mask comprises subtracting pixel adjustment values from corresponding pixel intensity values.

13. The method of claim 1 further comprising determining an offset mask offset comprising an average or median value of a kernel located near a center of the imaging array.

14. The method of claim 1, wherein the pixel intensity values of the subsequently acquired image data are adjusted in response to determining that the local contrast values for individual kernels of the subsequently acquired image data are greater than a contrast threshold.

15. A thermal imaging system comprising:
   an imaging array comprising an infrared focal plane array, the infrared focal plane array configured to generate signals corresponding to levels of infrared light incident on the infrared focal plane array;
   a detector circuit comprising readout electronics that receive the generated signals and output image data comprising an array of pixel intensity values; and
   a system controller configured to:
      divide at least a portion of the image data into a plurality of kernels;
      determine local contrast values for individual kernels, a local contrast value of an individual kernel based at least in part on pixel intensity values within the individual kernel;
      determine that the image frame is a locally flat image if the local contrast values for at least a predetermined number of the individual kernels are less than or equal to a contrast threshold; and
      in response to determining that the image frame is a locally flat image:
         calculate an array of pixel adjustment values to generate an offset mask; and
         adjust pixel intensity values of subsequently acquired image data using the offset mask.

16. The thermal imaging system of claim 15, wherein the system controller is further configured to divide individual kernels into sub-kernels and to determine an average or median value of pixel intensities within each sub-kernel.

17. The thermal imaging system of claim 16, wherein a local contrast value for an individual kernel comprises a difference between a maximum average or median value of a sub-kernel and a minimum average or median value of a sub-kernel within the individual kernel.

18. The thermal imaging system of claim 15, wherein the contrast threshold corresponds to a temperature of less than or equal to about 1 degree Celsius.

19. The thermal imaging system of claim 15, wherein the system controller is further configured to determine an offset mask offset comprising an average or median value of a kernel located near a center of the imaging array.

20. The thermal imaging system of claim 15, wherein the pixel intensity values of the subsequently acquired image data are adjusted in response to determining that the local contrast values for individual kernels of the subsequently acquired image data are greater than a contrast threshold.

* * * * *